March 11, 1969 F. J. ECCLES ET AL 3,432,847

ROTATION INPUT ENCODER ASSEMBLY

Filed April 2, 1965

INVENTORS
FRED J. ECCLES
HAROLD LANDOW

BY Albert F. Kronman

ATTORNEY

United States Patent Office 3,432,847

Patented Mar. 11, 1969

3,432,847

ROTATION INPUT ENCODER ASSEMBLY

Fred J. Eccles and Harold Landow, Stamford, Conn., assignors to Breeze Corporations, Inc., Union, N.J., a corporation of New Jersey Filed Apr. 2, 1965, Ser. No. 445,161

U.S. Cl. 340—347 1 Claim

Int. Cl. H03k 13/00

ABSTRACT OF THE DISCLOSURE

A shaft encoder, employing adjustable spring type roller contact members which pass over conductive and nonconductive segments on coaxial annular tracks of a rotary encoder disc as the shaft rotates. The position of the shaft at any time is indicated in binary form by the current flow thru the various contacts as they are above either conductive or nonconductive segments at that particular time.

This invention relates to rotational analog-to-digital converters and more specifically to an analog-to-digital converter employing roller contacts for converting a shaft position into a digital number representative of the shaft position.

Where it is desired to convert analog signals to digital form it has been found that an analog signal in the form of a shaft rotation can be transformed to digital form at a higher rate of speed and with greater accuracy than an analog signal in the form of an electrical voltage. Devices employing shaft rotation as the analog signal generally employ a rotation input encoder in the form of a rotating encoder disc having a separate annular track for each binary digit at the digital number to be represented. Each annular track includes separate conductive segments or areas which are representative of the value of the binary digit represented by the particular annular track. A conductive contact brush is placed against each of the annular rings and when a conductive area passes under the brush an electrical current will flow through the brush. In this manner, the value of each digit of the binary number which is representative of the shaft position is determined. By connecting an electrical conductor to each of the brushes, the binary number can be applied to a digital computer or other apparatus.

A persistant source of trouble in previously known rotation input encoders is the contact brush. Contact brushes have a relatively short life due to brush wear. Since prior art brushes are relatively large, it is necessary that the brush bounce when the disc is rotated at high speeds. The a relatively large amount of force in order to prevent brush be held against the surface of an encoder disc with relatively large force which is used to hold the brush in contact with the disc causes the frictional force generated at the surface of the disc and the brush to be large. Wear on both the surface of the disc and the brushes is substantial.

Other difficulties associated with encoder brushes arise from the shape of these devices as previously used. One type of encoder brush has a circular shape at the point of contact with the encoder disc. As this type of brush wears away, the contact area of the brush gradually increases, thereby causing the characteristics of the brush to change, eventually resulting in a switching failure.

Another type of prior art brush is L-shaped and has a narrow arm which is positioned perpendicular to the surface of the encoder disc and contacts the disc at one end. The arm of this type of brush must be relatively long if it is to have a reasonably long useful life since the brush will wear down rapidly. However, since the drum is rotating, it will exert a drag on the end of the arm which is in contact with the drum. The brush is thereby displaced a distance which is proportional to the length of the brush and the speed of the disc. The position of the brush on the encoder disc, therefore, cannot be determined with precision, and the accuracy of the encoder disc is adversely affected.

Accordingly, it is an object of the present invention to provide a highly accurate contact encoder having a relatively long useful life.

Another object of the present invention is to provide a rotational encoder having no overlapping of adjacent coding segments.

A further object of the present invention is to provide a contact brush encoder in which there will be no false voltage pattern resulting from brush width.

An object of the present invention is to greatly reduce encoder disc wear.

A further object of the present invention is to provide a rotational encoder capable of transferring higher signal currents.

Still another object of the present invention is to provide a rotational encoder in which there is no significant brush bounce or chatter, and which will provide a higher degree of encoding accuracy.

A feature of the present invention is its use of a roller contact in place of the usual sliding contact brush.

A further feature of the present invention is its adjustable mounting of the roller contact in a block assembly.

Still another feature of the present invention is its simple roller positioning with respect to the encoder disc.

The invention consists of the construction, combination and arrangement of parts, as herein illustrated, described and claimed.

In the accompanying drawing, forming a part hereof, there is illustrated one form of embodiment of the invention, in which drawing similar reference characters designate corresponding parts, and in which.

Figure 1:
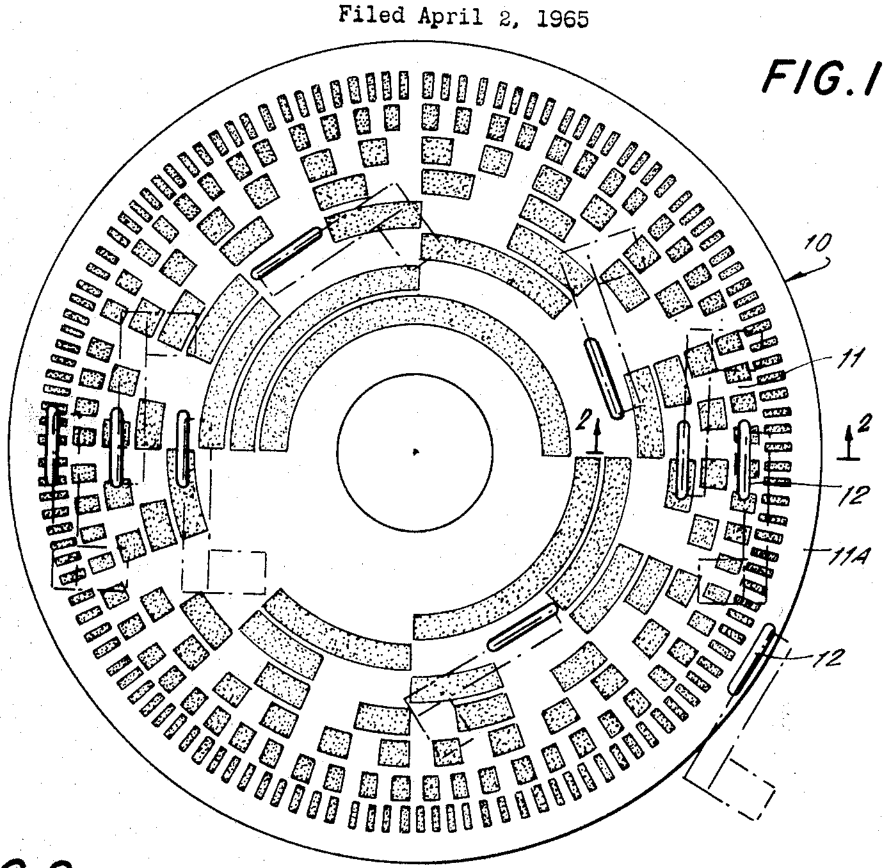
FIGURE 1 is a top plan view of a binary coding disc and roller contacts made in accordance with the present invention, with certain parts omitted for the sake of clarity.

Referring to the drawings and specifically to FIGURE 1, 10 indicates an encoder disc formed of some suitable dielectric material. The encoder disc 10 is provided with a plurality of coaxial annular tracks on one face thereof in which are included separate substantially coplanar electrically conductive segments or areas 11, representative of the value of the binary digit represented by the particular annular track. A roller contact 12, best shown in FIGURES 2, 3 and 4, rides upon the surface of the disc 10. One or more rollers are provided for each track, and the rollers 12 are so positioned that they will traverse a path coincident with their respective tracks. A common conductor track 11*a* is provided around the edge of the disc 10 and a source of potential (not shown) connected thereto by a brush or roller contact 12. The segments 11 are electrically connected to the common track 11*a* in accordance with known printed circuit techniques.

The roller contacts 12 are made of some suitable electrically conductive material such as silver. Each roller 12 is secured to a shaft 13 of electrically conductive material which is journaled within a ball bearing 14 carried by a dielectric block 15. The block 15, best shown in FIGURE 2, is secured to a leaf spring 16 which urges the roller 12 against the surface of the disc 10.

Figure 2:
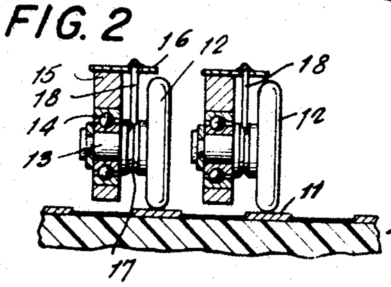
FIGURE 2 is a cross-sectional view taken on line 2—2 in FIGURE 1, looking in the direction of the arrows.
Figure 3:
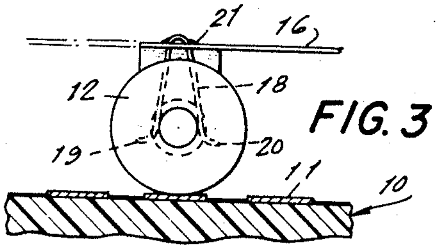
FIGURE 3 is a cross-sectional view taken on line 3—3 of FIGURE 2, looking in the direction of the arrows.

The shaft 13 is provided with an annular groove 17, best shown in FIGURE 2, between the roller 12 and the block 15. A hairpin shaped wire brush 18 is secured to the leaf spring 16 with its free end 19, 20, disposed on each side of the shaft 13, and with its inner surface riding within the groove 17 (see FIGURE 3). The wire brush is preferably silver plated in order to provide a good electrical wiping contact with the groove 17. In addition, the wire brush 18 is soldered to the leaf spring 16 as indicated at 21 to provide an electrical path from the segments 11, through the roller contact 12, the shaft 13, the brush 18, and into the leaf spring 16. The leaf spring 16 has a lead 25 connected thereto which in turn runs to a terminal board (not shown) in the well-known manner.

Figure 4:
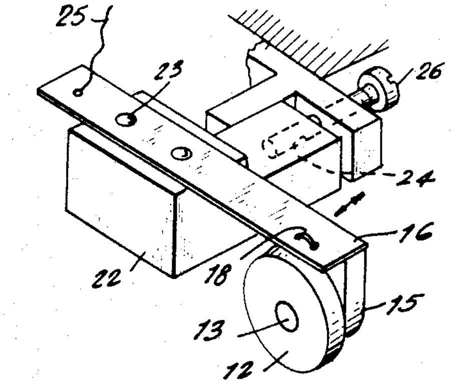
FIGURE 4 is a somewhat isometric view of a roller contact and block assembly made in accordance with the present invention.

The leaf spring 16 is secured to a support block 22, best shown in FIGURE 4, by means of rivets 23. The block 22 is bored as indicated at 24 to receive an adjusting screw 26.

Since the roller contact 12 rolls over the surface of the disc 10, as the disc is rotated, there is no significant roller "tracking" or wear between segments. The absence of substantial frictional contact between the roller and the disc greatly increases the useful life of the encoder assembly.

The pressure of the rollers 12 against the disc 10 is controlled by leaf spring 16, which is loaded in the direction of the disc 10 before assembly. Since the rollers ride smoothly around the track there is no significant "brush" bounce or chatter. The tangential contact of the rollers with the surface of the disc 10 results in a higher degree of encoding accuracy than is possible with prior art structures.

By using the support block 22 as the mounting for the rollers 12, it is possible to adjust the roller contact to the precise position upon the disc 10 after assembly by use of the adjusting screw 26 shown in FIGURE 4.

Having thus fully described the invention, what is claimed as new and desired to be secured by Letters Patent of the United States is:

1. A rotation input encoder assembly comprising an encoder disc, a plurality of coaxial annular tracks on one face of said disc, a plurality of electrically conductive segments in each of said tracks substantially coplanar with the face of the disc, a wheel-shaped electrically conductive contact member in rolling contact with each of the disc tracks and the segments therein, an electrically conductive shaft having an annular groove therein for said contact, a dielectric block to receive the shaft, a wire brush member of electrically conductive material in wiping contact with the shaft groove, spring means to urge the contact member against the disc face and the segments, a support block for the spring means, a threaded transverse bore in the support block and an adjusting screw within said bore to position the contact member upon the encoder disc.

References Cited

UNITED STATES PATENTS

| | | | |
|---|---|---|---|
| 3,163,858 | 12/1964 | Kirr et al. | 340—347 |
| 2,302,033 | 11/1942 | Johnson | 178—17 |

MAYNARD R. WILBUR, *Primary Examiner.*

C. D. MILLER, *Assistant Examiner.*